(12) United States Patent
Bernhardt et al.

(10) Patent No.: US 11,447,022 B2
(45) Date of Patent: Sep. 20, 2022

(54) STRUCTURAL MEMBERS CONTAINING ENERGY STORAGE

(71) Applicant: The Boeing Company, Chicago, IL (US)

(72) Inventors: Roger D. Bernhardt, St. Charles, MO (US); Daniel J. Clingman, Milton, WA (US)

(73) Assignee: The Boeing Company, Chicago, IL (US)

( * ) Notice: Subject to any disclaimer, the term of this patent is extended or adjusted under 35 U.S.C. 154(b) by 315 days.

(21) Appl. No.: 16/869,191

(22) Filed: May 7, 2020

(65) Prior Publication Data

US 2021/0347266 A1 Nov. 11, 2021

(51) Int. Cl.
*B60L 50/60* (2019.01)
*B64C 3/18* (2006.01)
*B64C 39/02* (2006.01)

(52) U.S. Cl.
CPC ............. *B60L 50/66* (2019.02); *B64C 3/187* (2013.01); *B64C 39/024* (2013.01); *B64C 2201/021* (2013.01); *B64C 2201/042* (2013.01)

(58) Field of Classification Search
CPC .......... B60L 50/66; B60L 50/60; B64C 3/187; B64C 39/024; B64C 2201/021; B64C 2201/042; B64C 3/16; B64C 39/02
See application file for complete search history.

(56) References Cited

U.S. PATENT DOCUMENTS

2021/0197691 A1* 7/2021 Stefanopoulou .. H01M 10/0568

* cited by examiner

*Primary Examiner* — Robert L Deberadinis
(74) *Attorney, Agent, or Firm* — Hanley, Flight & Zimmerman, LLC

(57) ABSTRACT

Structural members containing energy storage are disclosed. An example apparatus includes a first spring unit having a first plate spaced from a second plate and a first biasing element positioned between the first plate and the second plate. The first biasing element enables the first plate to move relative to the second plate in a direction along a longitudinal axis of the apparatus. A second spring unit has a third plate spaced from a fourth plate and a second biasing element positioned between the third plate and the fourth plate. The second biasing element enables the third plate to move relative to the fourth plate along the longitudinal axis of the apparatus. A battery is positioned between the first spring unit and the second spring unit.

20 Claims, 8 Drawing Sheets

STRUCTURAL MEMBERS CONTAINING ENERGY STORAGE

GOVERNMENT LICENSE RIGHTS

This invention was made with government support under FA8650-18-C-2807 awarded by United States Department of Defense. The government has certain rights in the invention.

FIELD

The present disclosure relates generally to aircraft and, more particularly, to structural members containing energy storage.

BACKGROUND

Vehicles employ structural components to support a frame of the vehicle. For example, aircraft employ structural components such as spars and ribs to support a wing of an aircraft.

SUMMARY

An example apparatus includes a first spring unit having a first plate spaced from a second plate and a first biasing element positioned between the first plate and the second plate. The first biasing element enables the first plate to move relative to the second plate in a direction along a longitudinal axis of the apparatus. A second spring unit has a third plate spaced from a fourth plate and a second biasing element positioned between the third plate and the fourth plate. The second biasing element enables the third plate to move relative to the fourth plate along the longitudinal axis of the apparatus. A battery is positioned between the first spring unit and the second spring unit.

Another structure assembly includes a first plate, a second plate, and a plurality of first springs positioned between the first plate and the second plate to enable the first plate to move relative to the second plate. The assembly includes a third plate, a fourth plate, and a plurality of second springs positioned between the third plate and the fourth plate to enable the third plate to move relative to the fourth plate. A battery is positioned between the second plate and the third plate. The first springs impart a first force to a first side of the battery and the second springs impart a second force to a second side of the battery opposite the first side.

Another example structure assembly includes means for store energy, means for imparting a first force, and means for imparting a second force. The means for providing energy is positioned between the means for imparting the first force and the means for imparting the second force. The means for imparting the first force to impart a force a first side of the means for providing energy and the means for imparting the second force to impart a force to a second side of the means for providing energy opposite the first side.

Figure 1:
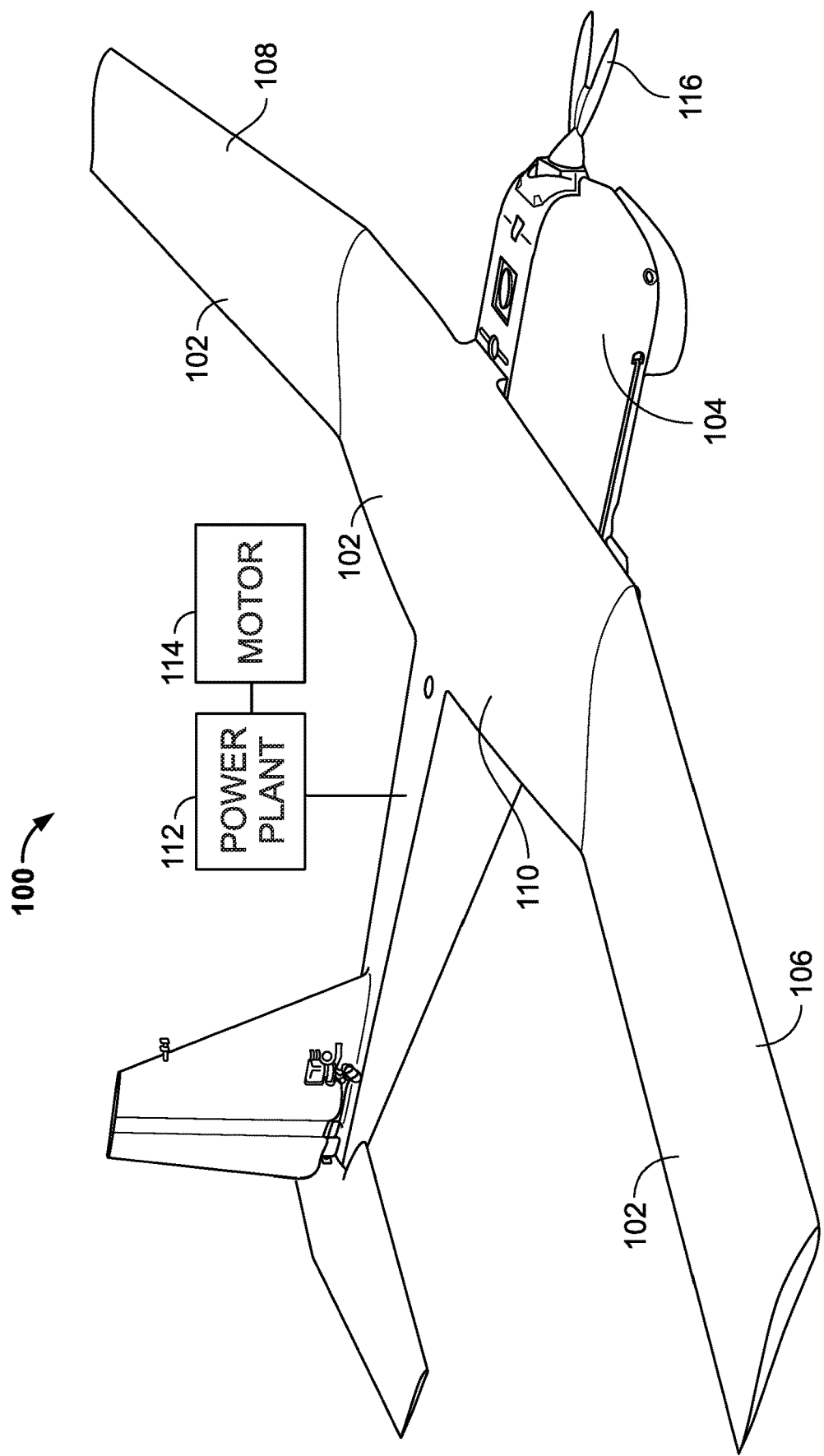
FIG. 1 is a perspective view of an example aircraft in which aspects of the present disclosure may be implemented.

Wherever possible, the same reference numbers will be used throughout the drawing(s) and accompanying written description to refer to the same or like parts. As used in this disclosure, stating that any part (e.g., a layer, film, area, or plate) is in any way positioned on (e.g., positioned on, located on, disposed on, or formed on, etc.) another part, means that the referenced part is either in contact with the other part, or that the referenced part is above the other part with one or more intermediate part(s) located therebetween. Stating that any part is in contact with another part means that there is no intermediate part between the two parts.

DESCRIPTION

Example structural members containing energy packs are disclosed herein. Specifically, example structural members disclosed herein have relatively high strength, are light weight, and include energy storage capability. For example, the structural members can be configured as beams, spars, frame members, and/or any other support structure(s) and include one or more batteries. In some examples, the structural members disclosed herein provide tension to support composite structures. For example, the structural members disclosed herein prevent composite structures (e.g., wing skins) from buckling. Further, the structural members disclosed herein provide compressive forces against batteries. The structural members disclosed herein have spring-like structures that impart compressive forces to the energy packs during a charging cycle and a discharging cycle of the energy packs. Example energy packs disclosed herein can be pouch cells that expand and contract during a charging/discharging cycle. The structural members disclosed herein can be employed with automobiles, aircraft, marine vehicles, all-terrain vehicles, mobile devices, prosthetic limbs, and/or any other device(s). An example structural member or assembly disclosed herein includes a first structure (e.g., a first spring unit), a second structure (e.g., a second spring unit), and a battery (e.g., a pouch-cell battery) positioned between the first structure and the second structure. An example first structure includes a first biasing element (e.g., a spring) to impart a first force to a first side of the battery and an example second structure includes a second biasing element (e.g., a spring) to impart a second force to a second side of the battery opposite the first side. The first structure and the second structure impart the respective first and second forces to the first and second sides, respectively, during a charge/discharge cycle of the battery. In some examples, the first and second forces are constant during the charge/discharge cycle. In some examples, the first and second forces vary (e.g., increase or decrease) during the charge/discharge cycle. Thus, the biasing elements can be configured to provide a constant spring rate or a variable spring rate. By combining the structural members and the energy packs, the structural members or assemblies disclosed herein can provide a lighter weight solution.

FIG. 1 illustrates an example aircraft 100 constructed in accordance with the teachings disclosed herein. The aircraft 100 includes a wing 102 (e.g., a fixed wing) extending outward from a fuselage 104. The wing 102 of the illustrated example includes a first wing portion 106, a second wing portion 108 and a center wing portion 110 joining the first wing portion 106 and the second wing portion 108. To power the aircraft 100, the aircraft 100 includes a power plant 112 (e.g., a battery pack). Specifically, the power plant 112 powers a motor 114 (e.g., an electric motor) that drives a propeller 116 to produce lift. The aircraft 100 of FIG. 1 is an unmanned aircraft system (UAS). Although the aircraft 100 of FIG. 1 is a UAS-type aircraft, the examples disclosed herein can be employed with commercial aircraft (e.g., a commercial airliner), military aircraft, marine vehicles, all-terrain vehicles, mobile devices, electronic devices, and/or any other device that employs battery packs and/or any other structures or frames.

Figure 2:
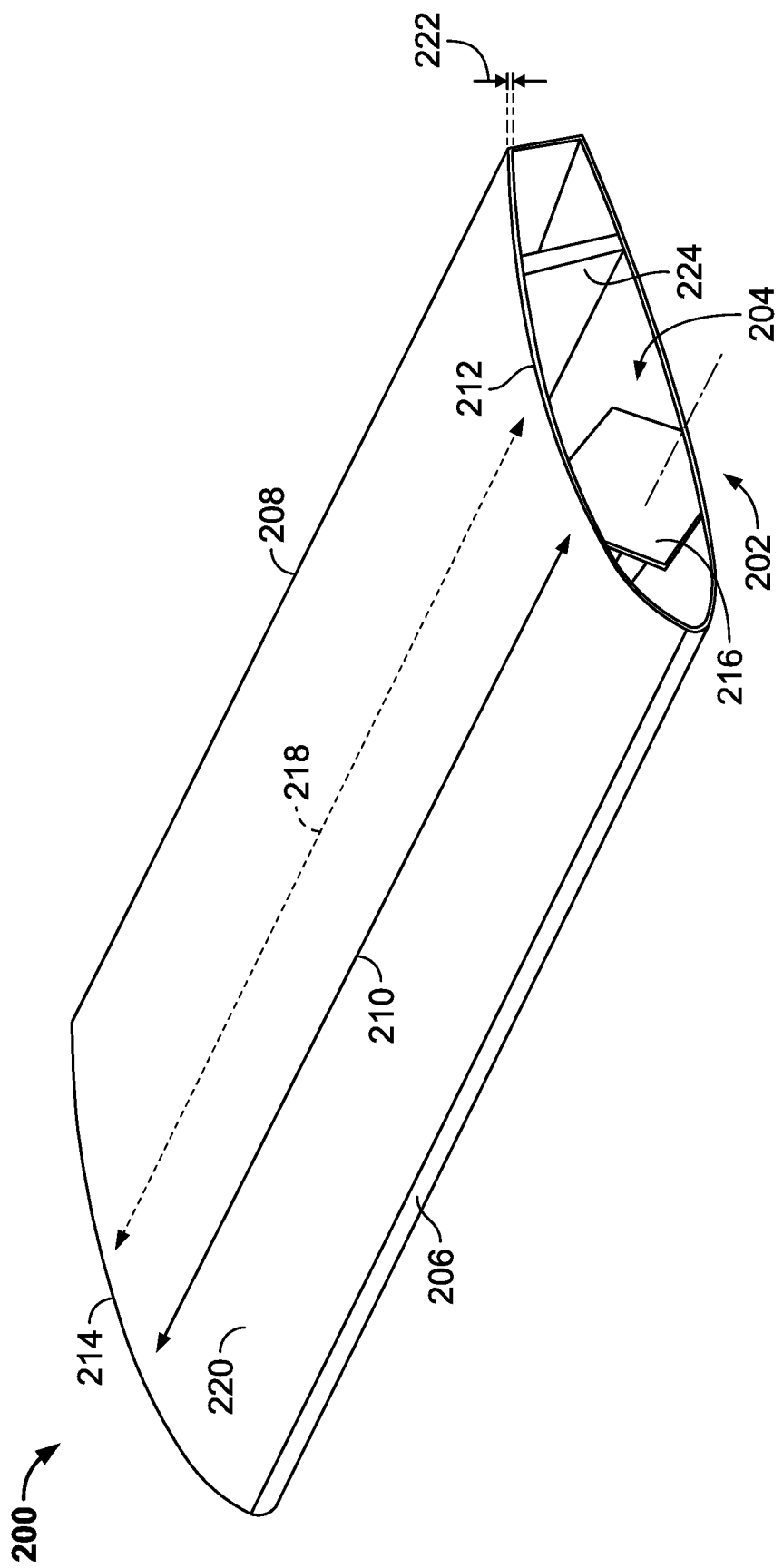
FIG. 2 is a front, perspective view of an example wing that can implement the example aircraft of FIG. 1.

FIG. 2 is a perspective view of an example wing 200 having an example structure 202 disclosed herein that can implement the wing 102 of the aircraft 100 of FIG. 1. For example, the wing 200 of FIG. 2 can implement each of the first wing portion 106, the second wing portion 108 and the center wing portion 110 of the aircraft 100 of FIG. 1. The structure 202 of FIG. 2 is positioned in a cavity 204 (e.g., provided by a wing box) of the wing 200. Specifically, the structure 202 is positioned between a leading edge 206 of the wing 200 and a trailing edge 208 of the wing 200 and extends in a longitudinal (e.g., chordwise) direction 210 between a first edge 212 (e.g., adjacent a wing tip or distal end) of the wing 200 and a second edge 214 (e.g., a wing root) of the wing 200. The structure 202 of FIG. 2 implements a spar 216 (e.g., a front spar) of the wing 200. The structure 202 induces tension 218 to a skin 220 of the wing 200 to reduce or prevent buckling of the skin 220. Specifically, the skin 220 is typically composed of a thin layer having a thickness 222 of approximately between 0.5 inches and 3 inches. Further, the skin 220 is composed of a material having relatively high stiffness characteristics such as, for example, carbon, fiberglass, etc. The structure 202 imparts the tension 218 to the skin 220 to reduce or prevent the skin 220 from buckling. The wing 200 can include other structural members such as, for example, a rear spar 224, ribs, stringers, etc. to provide structural support to the wing 200 and/or the structure 202. In some examples, the structure 202 can be configured to interact with one or more ribs in the spanwise direction and/or one or more stringers in the chordwise direction of the wing 200. For example, the spar 216 slidably fits in the cavity 204 (e.g., a spar cavity). One or more ribs (e.g., positioned in a chordwise direction) can support the structure 202 in the cavity 204.

Figure 3:
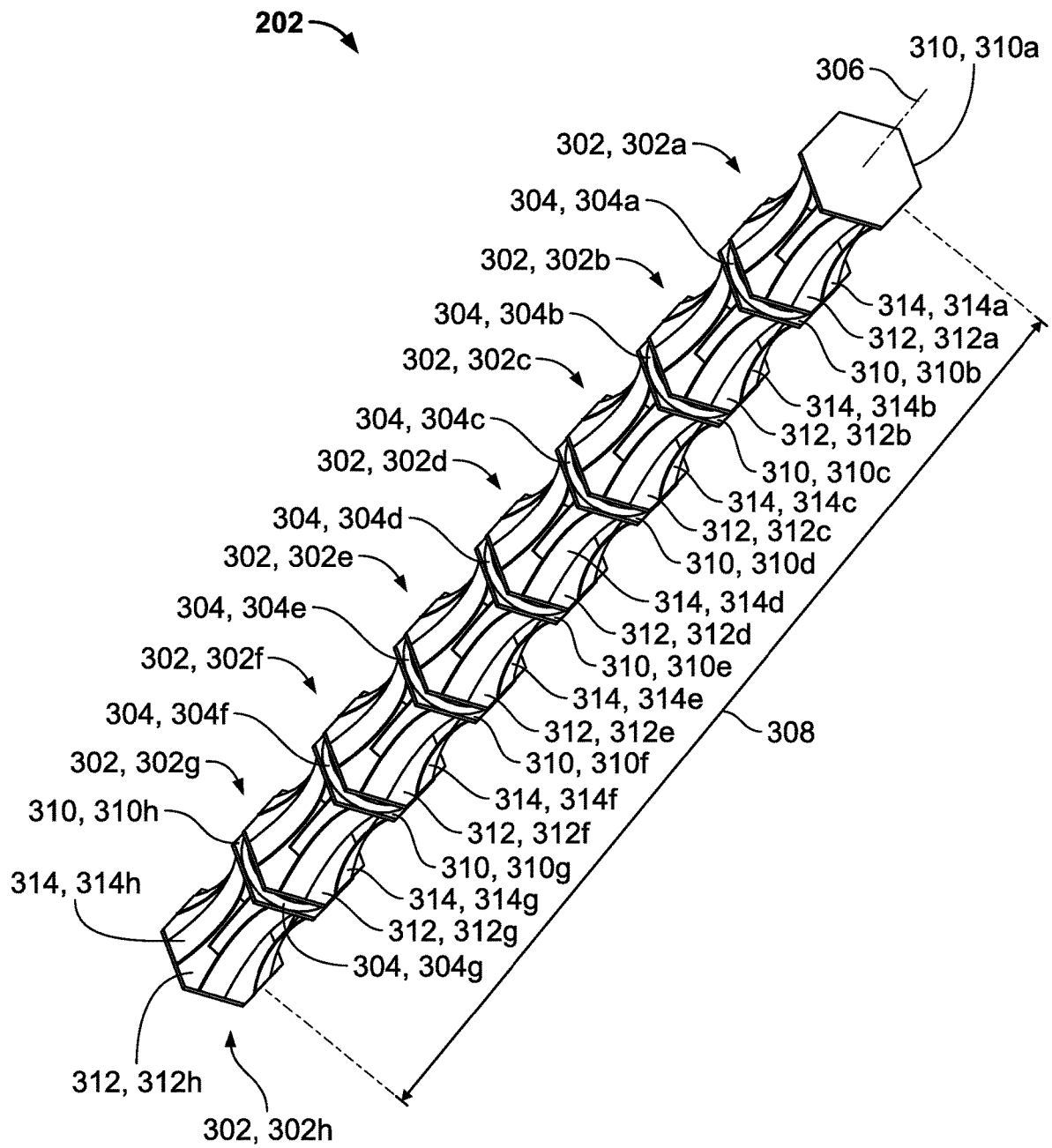
FIG. 3 is a perspective view of an example structure of FIG. 2.

FIG. 3 is a perspective view of the structure 202 of FIG. 2. The structure 202 includes a plurality of spring units 302 and a plurality of energy packs 304. For example, the energy packs 304 are positioned between respective ones of the spring units 302. In other words, the spring units 302 and the energy packs 304 are positioned in an alternating pattern or configuration. The energy packs 304 of the illustrated example are batteries configured as pouch cells that have a flexible or expandable lining (e.g., housing or pouch). Pouch cell type batteries provide efficient use of space and can achieve a 90 to 95 percent packaging efficiency, which is the highest among battery packs. The pouch cells disclosed herein can be composed of lithium-ion polymer (Li-polymer) and/or any other suitable material(s). Additionally, eliminating metal enclosures typically provided with batteries reduces weight.

The performance of the energy packs 304 (e.g. pouch-type cells) is based on a stack pressure imparted to the energy packs 304. For example, if a stack pressure is too small or too large, the energy packs 304 can be susceptible to dendrite formation, which can reduce the cycle efficiency of the energy packs 304. The spring units 302 provide a stack pressure (e.g., compression forces) to the energy packs 304 to improve performance of the energy packs 304 and/or reduce dendrite formation. Additionally, the energy packs 304 have a variable volume (e.g., that increases or decreases) during a charge/discharge cycle. For example, a volume or size of the energy packs 304 expands during a charging cycle and reduces or contracts during a discharging cycle. The spring units 302 allow the contraction and expansion of the energy packs 304 during the charge/discharge cycle. The spring units 302 provide a constant force to the energy packs 304 during the charge/discharge cycle. However, in some examples, compression forces provided by the spring units 302 can vary (e.g., increase or decrease) between the charge/discharge cycle. Additionally, the energy packs 304, being stacked with the spring units 302, counteract these compression forces to enable the structure 202 to provide tension forces to the wing 200. Thus, when the structure 202 is configured as a spar for the wing 200, the structure 202 (e.g., spar) can be used to generate and/or counterbalance the tension and/or compression desired for the skin 220 and the energy packs 304.

The structure 202 of the illustrated example includes a first spring unit 302a, a second spring unit, 302b, a third spring unit 302c, a fourth spring unit 302d, a fifth spring unit 302e, a sixth spring unit 302f, a seventh spring unit 302g, and an eighth spring unit 302h that are stacked or arranged in an alternating pattern with a first energy pack 304a, a second energy pack 304b, a third energy pack 304c, a fourth energy pack 304d, a fifth energy pack 304e, a sixth energy pack 304f, and a seventh energy pack 304g. The spring units 302 and the energy packs 304 are stacked along a longitudinal axis 306 of the structure 202. The structure 202 has a length 308 in a direction along the longitudinal axis 306. For example, the length 308 can be any desired length. In this example, the length 308 extends between (e.g., is equal to a length between) the first edge 212 (FIG. 2) and the second edge 214 (FIG. 2) of the wing 200 of FIG. 2. For example, the first spring unit 302a is positioned adjacent the first edge 212 of the wing 200 and the eighth spring unit 302h (e.g., at opposite end from the first spring unit 302a) is positioned adjacent the second edge 214 of the wing 200.

The spring units 302 are support structures having first ends or first plates 310, second ends or second plates 312 and biasing elements 314 positioned between the respective first plates 310 and the second plates 312. The biasing elements 314 enable the first plates 310 to move relative to the respective second plates 312 in a direction (e.g., a rectilinear direction) along the longitudinal axis 306 of the structure 202. For example, the first spring unit 302a (e.g., a first structure) has a first plate 310a spaced from a second plate 312a and a first biasing element 314a positioned between the first plate 310a and the second plate 312b to enable the first plate 310a to move relative to the second plate 312b in a direction along the longitudinal axis 306 of the structure 202. The second spring unit 302b defines a second structure having a first plate 310b spaced from a second plate 312b and a second biasing element 314b positioned between the first plate 310b and the second plate 312b to enable the first plate 310*b* to move relative to the second plate 312*b* in the direction along the longitudinal axis 306 of the structure 202. The third spring unit 302*c* defines a third structure having a first plate 310*c* spaced from a second plate 312*c* and a second biasing element 314*c* positioned between the first plate 310*c* and the second plate 312*c* to enable the first plate 310*c* to move relative to the second plate 312*c* in the direction along the longitudinal axis 306 of the structure 202. The fourth spring unit 302*d* defines a fourth structure having a first plate 310*d* spaced from a second plate 312*d* and a fourth biasing element 314*d* positioned between the first plate 310*d* and the second plate 312*d* to enable the first plate 310*d* to move relative to the second plate 312*d* in the direction along the longitudinal axis 306 of the structure 202. The fifth spring unit 302*e* defines a fifth structure having a first plate 310*e* spaced from a second plate 312*e* and a fifth biasing element 314*e* positioned between the first plate 310*e* and the second plate 312*e* to enable the first plate 310*e* to move relative to the second plate 312*e* in the direction along the longitudinal axis 306 of the structure 202. The sixth spring unit 302*f* defines a sixth structure having a first plate 310*f* spaced from a second plate 312*f* and a sixth biasing element 314*f* positioned between the first plate 310*f* and the second plate 312*f* to enable the first plate 310*f* to move relative to the second plate 312*f* in the direction along the longitudinal axis 306 of the structure 202. The seventh spring unit 302*g* defines a seventh structure having a first plate 310*g* spaced from a second plate 312*g* and a seventh biasing element 314*g* positioned between the first plate 310*g* and the second plate 312*g* to enable the first plate 310*g* to move relative to the second plate 312*g* in the direction along the longitudinal axis 306 of the structure 202. The eighth spring unit 302*h* defines an eighth structure having a first plate 310*h* spaced from a second plate 312*h* and an eighth biasing element 314*h* positioned between the first plate 310*h* and the second plate 312*h* to enable the first plate 310*h* to move relative to the second plate 312*h* in the direction along the longitudinal axis 306 of the structure 202.

Although the example structure 202 includes eight spring units 302*a-h* and seven energy packs 304*a-g*, the structure 202 can include any number of spring units 302 and/or energy packs 304. For example, the structure 202 can include the first energy pack 304*a* positioned between the first spring unit 302*a* and the second spring unit 302*b*. In some examples, a structure can include the first spring unit and the first energy pack 304*a*. In some examples, the structure 202 can include more than eight spring units and more than seven energy packs 304, or less than eight spring units 302 and less than seven energy packs 304.

Figure 4:
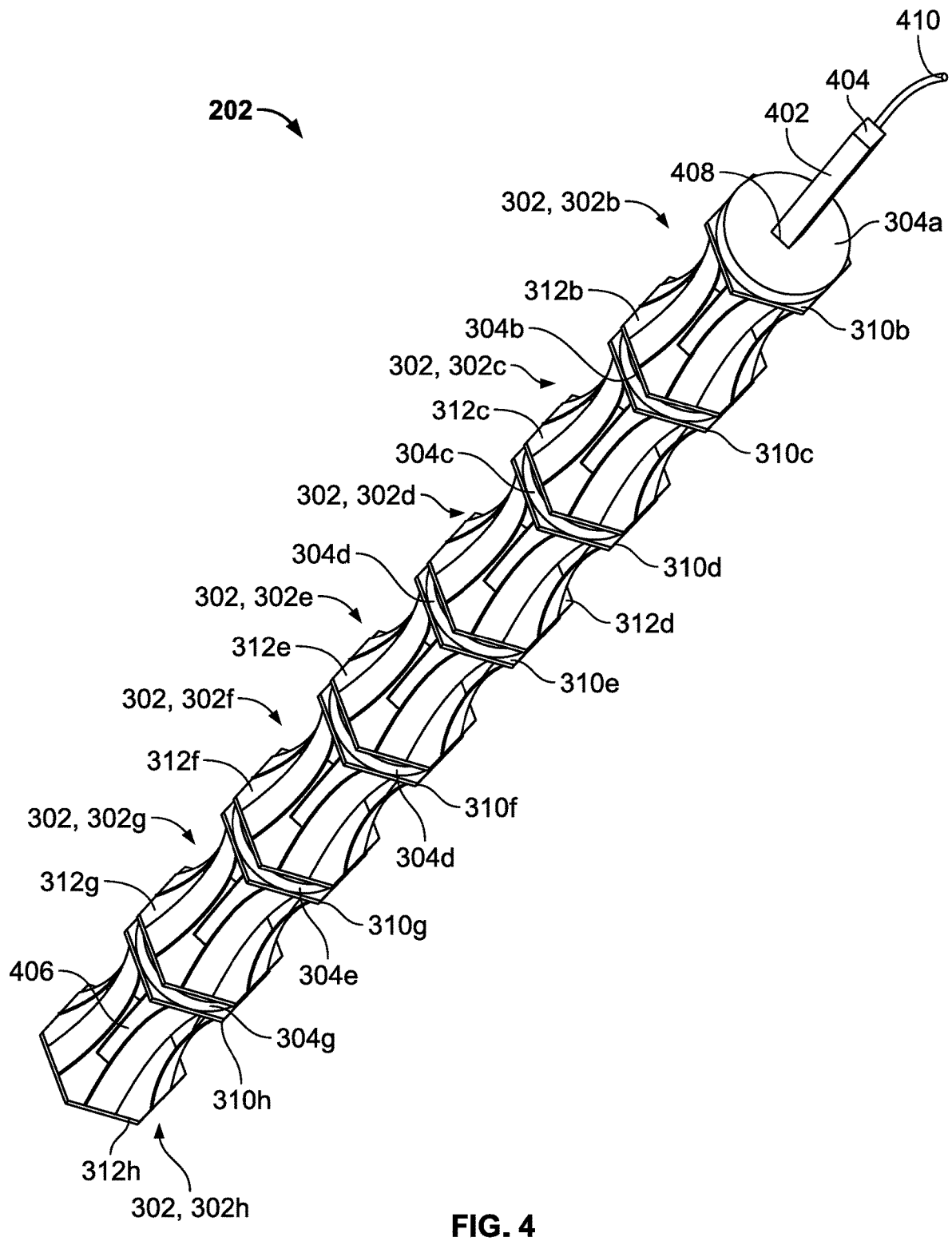
FIG. 4 is a partially assembled view of the example structure of FIG. 3.

FIG. 4 is a perspective, partially assembled view of the example structure 202 of FIGS. 2 and 3. FIG. 4 illustrates the structure 202 without the first spring unit 302*a* (FIG. 3). The structure 202 of the illustrated example includes a guide rod 402 defining a first end 404 and a second end 406 opposite the first end 404. For example, the structure 202 includes a central aperture 408 to receive (e.g., slidably receive) the guide rod 402. For example, the first plates 310*b-h*, the second plates 312*a-g*, and the energy packs 304*a-g* can include openings (e.g., central apertures) that align to define the central aperture 408. The first plate 310*a* (FIG. 3) of the first spring unit 302*a* and the second plate 312*h* of the eighth spring unit 302*h* can each include a central aperture or a recess (e.g., a partial opening that does not extend through the respective first plate 310*a* and the second plate 312*h*) to receive the first end 404 and the second end 406 of the guide rod 402, respectively. In some examples, the first plate 310*a* and the second plate 312*h* do not include an aperture and the first end 404 of the guide rod 402 engages an inner surface of the first plate 310*a* and the second end 406 engages an inner surface of the second plate 312*h*.

To assembly the structure 202, the eighth spring unit 302*h* is positioned on the guide rod 402 and moved (e.g., slid along the guide rod 402) adjacent the second end 406 of the guide rod 402. In some examples, the second plate 312*h* of the eighth spring unit 302*h* is coupled (e.g., fixed or attached) to the second end 406 of the guide rod 402. In some examples, the second plate 312*h* of the eighth spring unit 302*h* can move (e.g., slide) along the guide rod 402. However, the second plate 312*b* of the eighth spring unit 302*h* is prevented from decoupling (e.g., removing of sliding off) from (e.g., the second end 406 of) the guide rod 402 via a pin, cap, or other fastener coupled to the second end 406 of the guide rod 402.

The seventh energy pack 304*g* is positioned on the guide rod 402 and moved (e.g. slid) into engagement with the first plate 310*h* of the eighth spring unit 302*h*. The seventh spring unit 302*g* is positioned on the guide rod 402 and moved (e.g., slid) on the guide rod 402 until the second plate 312*g* of the seventh spring unit 302*g* engages the seventh energy pack 304*g*. The sixth energy pack 304*f* is positioned on the guide rod 402 and moved (e.g., slid) into engagement with the first plate 310*g* of the seventh spring unit 302*g*. The sixth spring unit 302*f* is positioned on the guide rod 402 and moved (e.g., slid) along the guide rod 402 until the second plate 312*f* of the sixth spring unit 302*f* engages the sixth energy pack 304*f*. The fifth energy pack 304*e* is positioned on the guide rod 402 and moved (e.g. slid) into engagement with the first plate 310*f* of the sixth spring unit 302*f* The fifth spring unit 302*e* is positioned on the guide rod 402 and moved (e.g., slid) along the guide rod 402 until the second plate 312*e* of the fifth spring unit 302*e* engages the fifth energy pack 304*e*. The fourth energy pack 304*d* is positioned on the guide rod 402 and moved (e.g., slid) into engagement with the first plate 310*e* of the fifth spring unit 302*e*. The fourth spring unit 302*d* is positioned on the guide rod 402 and moved (e.g., slid) along the guide rod 402 until the second plate 312*d* of the fourth spring unit 302*d* engages the fourth energy pack 304*d*. The third energy pack 304*c* is positioned on the guide rod 402 and moved (e.g., slid) into engagement with the first plate 310*d* of the fourth spring unit 302*d*. A third spring unit 302*c* is positioned on the guide rod 402 and moved (e.g., slid) along the guide rod 402 until a second plate 312*c* of the third spring unit 302*c* engages the third energy pack 304*c*. The second energy pack 304*b* is positioned on the guide rod 402 and moved (e.g., slid) into engagement with the first plate 310*c* of the third spring unit 302*c*. The second spring unit 302*b* is positioned on the guide rod 402 and moved (e.g., slid) along the guide rod 402 until the second plate 312*b* of the second spring unit 302*b* engages the second energy pack 304*b*.

The first energy pack 304*a* is positioned on the guide rod 402 and moved (e.g., slid) into engagement with the first plate 310*b* of the second spring unit 302*b*. The first spring unit 302*a* (FIG. 3) is positioned on the guide rod 402 and moved (e.g., slid) along the guide rod 402 until the second plate 312*b* (FIG. 3) of the first spring unit 302*a* engages the first energy pack 304*a*. In some examples, the first plate 310*a* (FIG. 3) of the first spring unit 302*a* is coupled (e.g., fixed or attached to) the first end 404 of the guide rod 402. In some examples, the first plate 310*a* of the first spring unit 302*a* can move (e.g., slide) along the guide rod 402 but is prevented from decoupling (e.g. removing or sliding off) from the guide rod 402 via a pin, cap, or other fastener coupled to the first end 404 of the guide rod 402. In some examples, the spring units 302 are pre-assembled prior to installing the spring units 302 on the guide rod 402. In some examples, the spring units 302 are assembled on the guide rod 402.

The energy packs 304 disclosed herein can be configured in series, parallel or a mixture of both to provide a desired desired voltage, capacity, or power density. The energy packs 304 of the illustrated example are stacked in series and are connected via a power bus 410 that extends along the guide rod 402 between the first end 404 and the second end 406. In some examples, battery regulators can be employed to maintain a voltage of a respective one of the energy packs 304 below its maximum value during charging to allow a weaker energy pack to become fully charged, bringing all the energy packs 304 into balance, which increases performance of the energy packs 304.

In some examples, the spring units 302 (e.g., the first plates 310, the second plates 312 and the biasing elements 314) can be composed of electrically conductive materials to electrically couple the energy packs 304 instead of the power bus 410. For example, the spring units 302 can have electrically conductive leads (e.g., copper leads) embedded in the first plates 310, the second plates 312 and the biasing elements 314 to define an electrical path between the energy packs 304 and electrical components of the aircraft 100. In some examples, the guide rod 402 is not needed with the structure 202. In some such examples, adhesive can be employed to couple the energy packs 304 and the spring units 302. In some examples, an electrically conductive adhesive can be provided to couple the energy packs 304 and the spring units 302.

Figure 5A:
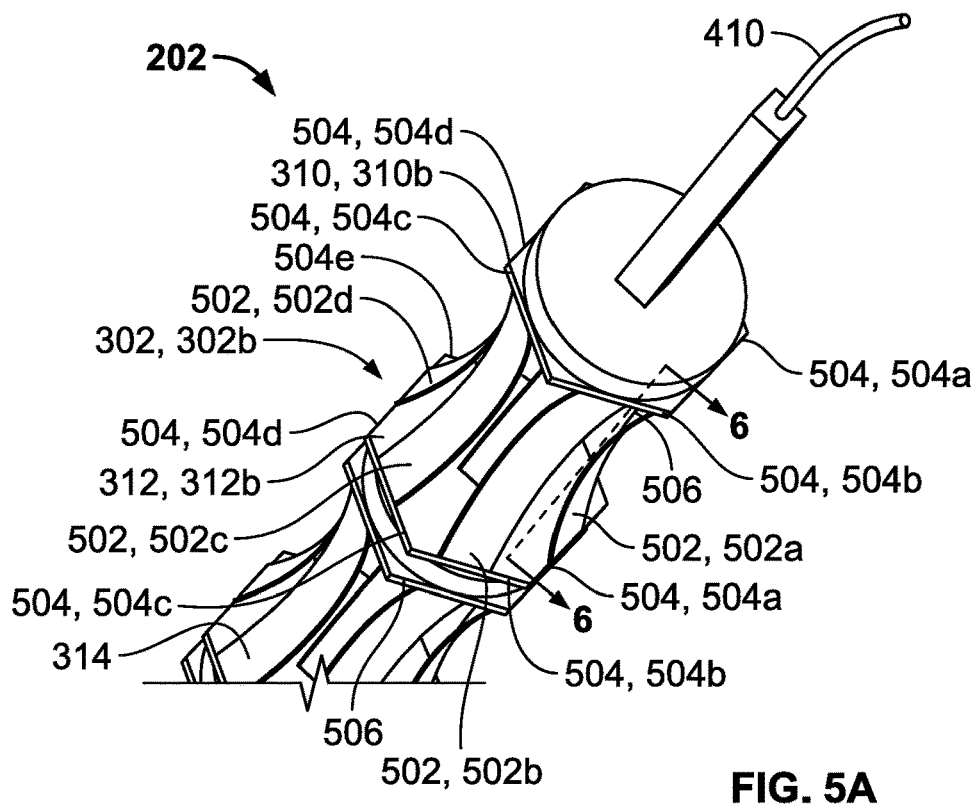
FIG. 5A is a partially enlarged view of the example structure of FIG. 4.
Figure 5B:
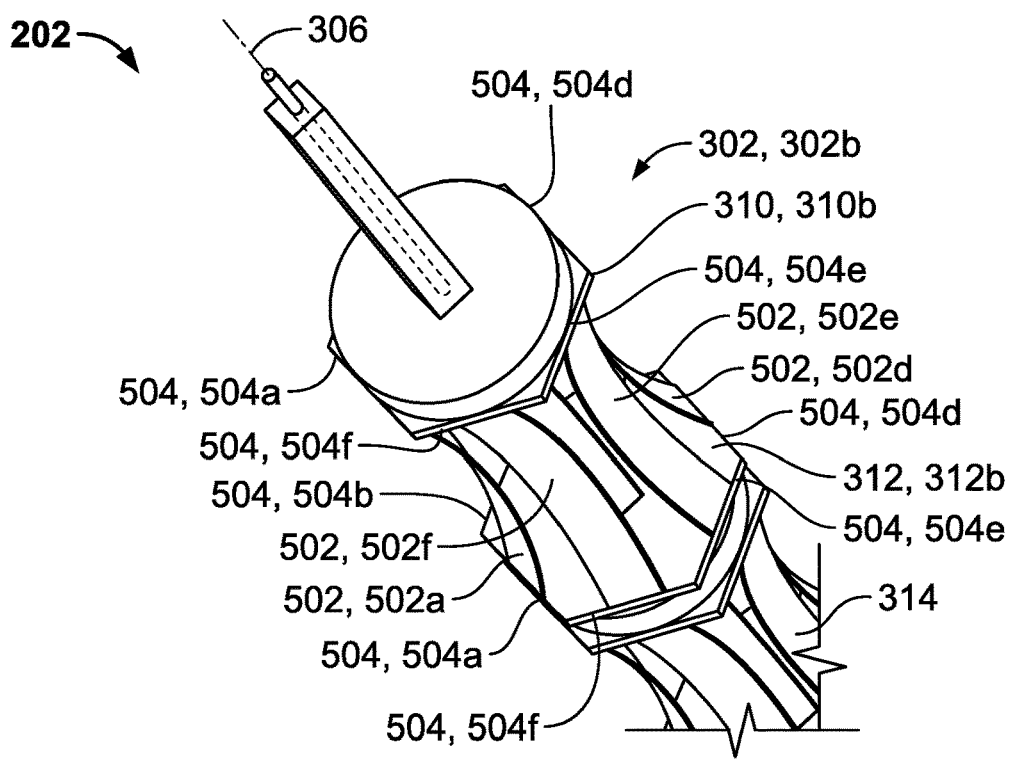
FIG. 5B is another partially enlarged view of the example structure of FIG. 4.

FIG. 5A is a partial, perspective view of the example structure 202 of FIG. 4. FIG. 5B is another partial, perspective view of the example structure 202 of FIG. 5A. The biasing elements 314 of each of the spring units 302 includes a plurality of springs 502. Specifically, the springs 502 of the illustrated example are leaf springs. The springs 502 are radially spaced around the longitudinal axis 306 of the structure 202. Additionally, the springs 502 have arcuate profiles or shapes (e.g., elongated C-shaped profiles) such that a body (e.g., mid-point) of the springs 502 protrudes toward or is closer towards the longitudinal axis 306 of the structure 202 compared to respective ends of the springs 502.

Each of the spring units 302 includes a first spring 502a, a second spring 502b, a third spring 502c, a fourth spring 502d, a fifth spring 502e and a sixth spring 502f. Each of the first plates 310 and the second plates 312 have sides 504 that support the springs 502. For example, the first plates 310 and the second plates 312 of the illustrated example have a hexagonal shape (e.g., six sides). For example, each of the first plates 310 and the second plates 312 include first sides 504a, second sides 504b, third sides 504c, fourth sides 504d, fifth sides 504e and sixth sides 504f. For example, the first sides 504a of the first and second plates 310, 312 align to support the first spring 502a, the second sides 504b of the first and second plates 310, 312 align to support the second spring 502b, the third sides 504c of the first and second plates 310, 312 align to support the third spring 502c, the fourth sides 504d of the first and second plates 310, 312 align to support the fourth spring 502d, the fifth sides 504e of the first and second plates 310, 312 align to support the fifth spring 502e, and the sixth sides 504f of the first and second plates 310, 312 align to support the sixth spring 502f. The spring units 302a-302h are identical (e.g., except the first plate 310a and the first plate 310h relating to the central aperture 408). To pivotally capture the springs 502, each of the sides 504 of the first plates 310 and the second plates 312 have lips 506. The lips 506 of the first plates 310 protrude from (e.g., away from) the respective first plates 310 and the lips 506 of the second plates 312 protrude away from the second plates 312.

In some examples, the biasing elements 314 can be coil springs. For example, each spring unit 302 can have a coil spring positioned between the first plate 310 and the second plate 312. In some examples, each of the biasing elements 314 can be a bellows-type spring. In some examples, the biasing elements 314 is a plurality of flexible legs integrally formed with the spring units 302. For example, each of the spring units 302 can include a plurality of deflectable or collapsible legs or walls that are integrally formed with the first plate 310 and the second plate 312. In some examples, the biasing elements 314 can be any biasing element or spring to enable the first plate 310 to move relative to the second plate 312.

Figure 6:
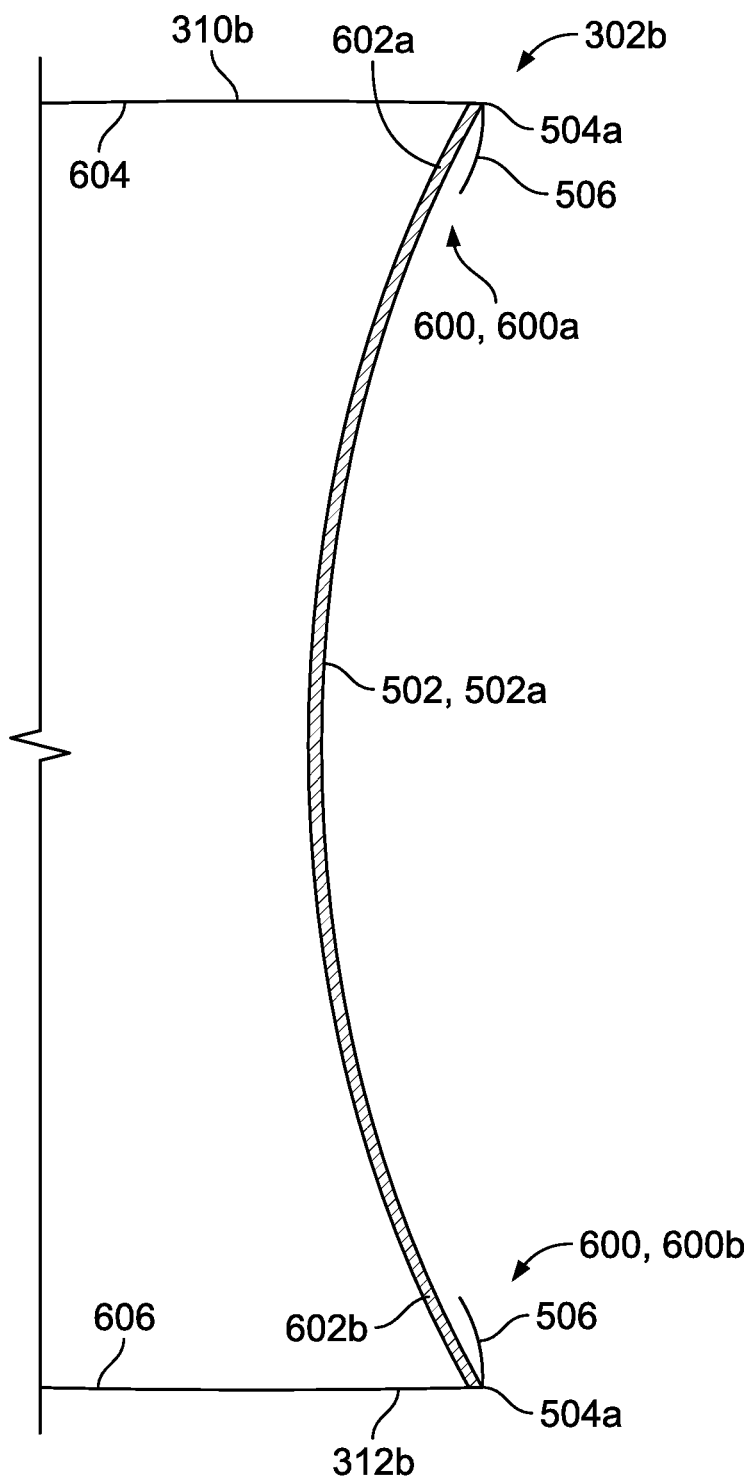
FIG. 6 is a partial, cross-sectional view of the example structure taken along line 6-6 of FIG. 4.

FIG. 6 is a partial, cross-sectional view of the second spring unit 302b taken along line 6-6 of FIG. 5A. FIG. 6 illustrates a connection 600 of the first spring 502a of the second spring unit 302b relative to the first plate 310b and the second plate 312b. Specifically, The spring 502a has a first end 602a coupled to the first plate 310b via a first connection 600a and a second end 602b opposite the first end 602a coupled to the second plate 312b via a second connection 600b. Although only the first spring 502a is shown in FIG. 6, the connection 600 is identical for the other springs 502b-502f for the spring units 302a-302h. Thus, for brevity, the connections of the other springs 502a-502f of the spring units 302a-302h are not described.

The first connection 600a and the second connection 600b are pin connections. For example, the first connection 600a enables the first end 602a of the first spring 502a to pivot relative to the first plate 310b and the second connection 600b enables the second end 602b of the first spring 502a to pivot relative to the second plate 312b. The lip 506 of the first side 504a of the first plate 310b protrudes away from an inner surface 604 of the first plate 310b. The lip 506 of the first side 504a of the second plate 312b of the first side 504a of the second plate 312b protrudes away from an inner surface 606 of the second plate 312b. The first side 504a of the first plate 310b is aligned with the first side 504a of the second plate 312b. In other words, the lip 506 of the first plate 310b protrudes toward the lip 506 of the second plate 312b. Additionally, the lips 506 have arcuate profiles that taper towards the longitudinal axis 306 (FIG. 3) of the structure 202. The first spring 502a is captured between the first plate 310b and the second plate 312b. For example, the first end 602a (e.g., a first edge) is captured within a cavity formed by the lip 506 and the inner surface 604 of the first plate 310b and the second end 602b (e.g., a second edge) is captured within a cavity formed by the lip 506 and the inner surface 606 of the second plate 312b. The first spring 502a has an arcuate profile or shape such that a body or portion (e.g., a mid-point) between the first end 602a and the second end 602b protrudes toward the longitudinal axis 306 (FIG. 3).

The lip 506 of the first side 504a of the first plate 310b enables the first end 602a of the first spring 502a to rotate or pivot relative to the first plate 310b and/or the lip 506 of the first plate 310b when the first spring 502a moves between a first position (e.g., a buckled position) and a second position (e.g., a non-buckled position). The lip 506 of the first side 504a of the second plate 312b enables the second end 602b of the first spring 502a to rotate or pivot relative to the second plate 312b and/or the lip 506 of the second plate 312b when the first spring 502a moves between a first position (e.g., a buckled position) and a second position (e.g., a non-buckled position). Thus, the first connection 600a and the second connection 600b are pin connections. As used herein, a pin connection transfers loads (e.g., vertical and/or horizontal forces) and does not resist bending or moment (rotational) forces. Thus, the first spring 502a is capable of deflecting between the buckled position and non-buckled position. For example, the first end 602a and the second end 602b can rotate relative to the respective lips 506 when the first spring 502a deflects and/or extends in a direction along the longitudinal axis 306 of the structure 202. In some examples, the first end 602a can be fixed (e.g., welded) to the first plate 310b and/or the second end 602b can be fixed (e.g., welded) to the second plate 312b.

Figure 7:
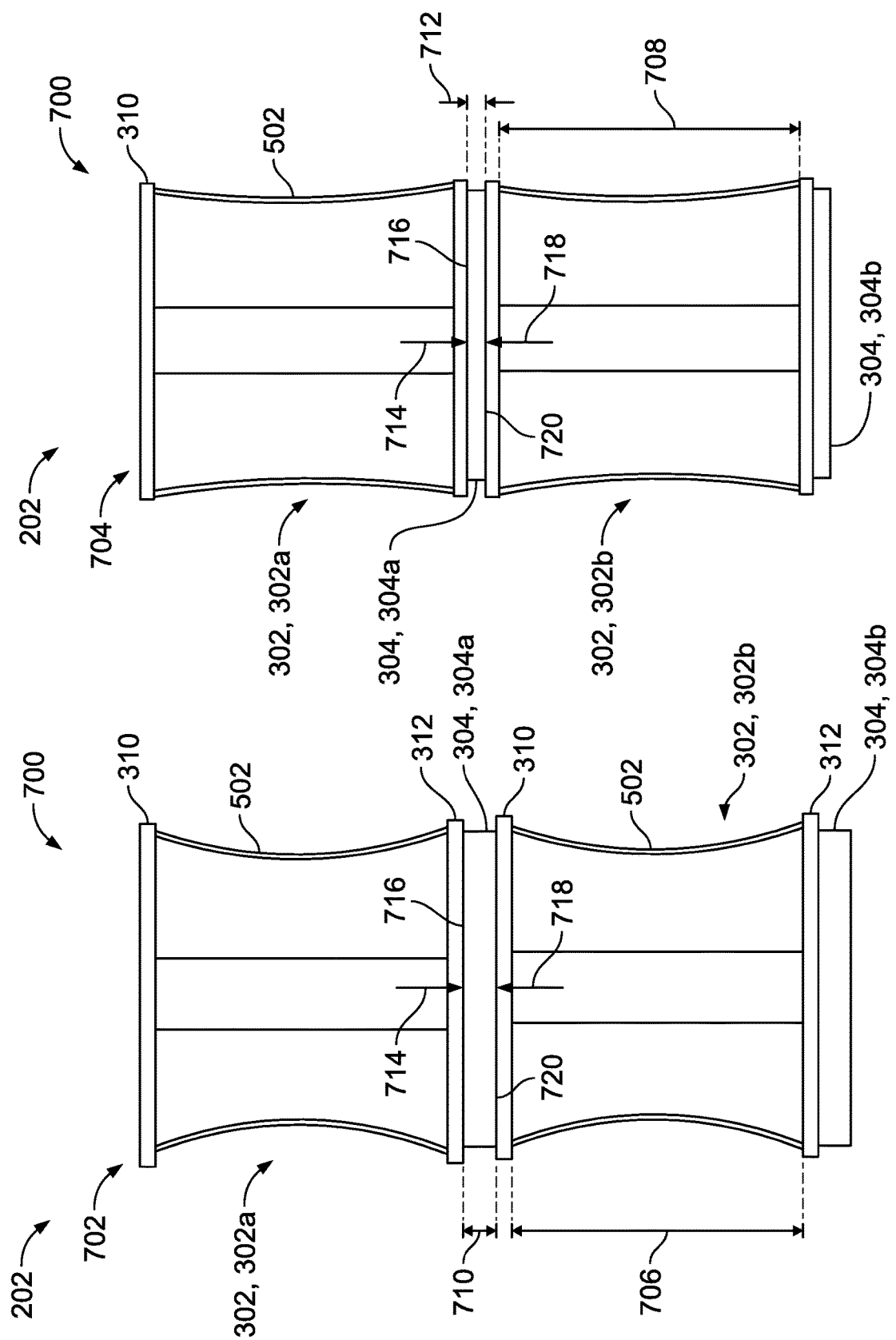
FIG. 7A is a front view of a portion of the structure of FIGS. 3-4 shown in a first position.
FIG. 7B is a front view of the portion of the structure of FIG. 7A shown in a second position.

FIG. 7A illustrates a portion 700 of the structure 202 in a first position 702 (e.g., a buckled position). FIG. 7B illustrates the portion 700 of the structure 202 in a second position 704 (e.g., a non-buckled position). The portion 700 includes the first spring unit 302a and the second spring unit 302b and the first energy pack 304a and second energy pack 304b. In the first position 702, the springs 502 are in a buckled state and the first energy pack 304a is in a charged state (e.g., a fully charged state). In the second position 704, the springs 502 are in an extended state (e.g., a non-buckled state) and the first energy pack 304a is a discharged state (e.g., a charge level that is less than a charge level or state of the first energy pack 304a shown in the first position 702).

In the first position 702, the springs 502 have a first spring height 706. In the second position 704, the springs 502 have a second spring height 708 greater than the first spring height 706. The springs 502 deflect between the first position 702 (e.g., the buckled state) and the second position 704 (e.g., the non-buckled state) to impart a compressive force to the energy packs 304 based on an energy capacity of the energy packs 304. For example, in a charged state (e.g., a fully charged state), the energy packs 304 have a first thickness 710 (e.g., a vertical height). For example, in a discharged state (e.g., a fully discharged state), the energy packs 304 have a second thickness 712 that is less than the first thickness 710. Thus, as the energy capacity of the energy packs 304 discharge, the energy packs 304 reduce in size and as the energy capacity of the energy packs 304 increase, the energy packs 304 increase in size. Thus, a thickness or volume of each energy pack 304 varies (e.g., increases or decreases) based on a charge state of the energy pack 304. The first spring unit 302a and the second spring unit 302b impart a load on the energy pack 302a as the thickness (or volume) varies during a charging or discharging cycle. The springs 502 of the first spring unit 302a impart a compressive force 714 to a first side 716 of the first energy pack 304a and the springs 502 of the first spring unit 302a impart a compressive force 718 to a second side 720 of the first energy pack 304a opposite the first side 716. The springs 502 provide compressive forces 714, 718 as the energy packs 304 vary between the first thickness 710 and the second thickness 712. Thus, when the structure 202 is coupled the wing 200 of FIG. 2, a clearance is provided between the plates 310, 312 and the skin 220 to allow the plates 310, 312 to move relative to the guide rod 402. Thus, other structural components of the wing 200 can be used to support the structure 202 positioned in the wing 200. In some examples, the plates 310a and/or 310h are coupled (e.g., fixed) to respective spar caps of the wing 200. In some examples, the guide rod 402 can be attached to the wing box, ribs, frames, etc.

Referring to FIGS. 1-4, 5A, 5B, 6, 7A and 7B, in operation, the structure 202 transmits compression forces 714, 718 in a direction along the longitudinal axis 306 of the structure 202 (e.g., a chordwise direction of the wing 200 in the orientation of FIG. 2). For example, the spring units 302 impart compression forces 714, 718 (e.g., a constant compression force) to the energy packs 304 during a charging cycle and/or a discharging cycle. Additionally, during a charging and/or discharging cycle, the energy packs 304 change a dimensional characteristic. To provide a stack pressure on the energy packs during a charging and/or discharging cycle, the spring units 302 vary (e.g., increase or decrease) a spring force to provide compression forces 714, 718 to the energy packs 304 during the charging and/or discharging cycles. In response to a charging cycle, the energy packs 304 increase in height (e.g., to the first thickness 710 of FIG. 7A), thereby causing the respective first plates 310 and second plates 312 in contact with the energy packs 304 to move and cause the springs 502 of the respective adjacent spring units 302 to compress to a spring height such as, for example, the first spring height 706 of FIG. 7A as the energy is stored in the energy packs 304. In response to a discharging cycle, the energy packs 304 decrease in thickness (e.g., to the second thickness 712 of FIG. 7B), thereby causing the springs 502 of the respective adjacent spring units 302 to extend to a spring height such as, for example, the second spring height 708 of FIG. 7B as the energy discharges from the energy packs 304, which in turn causes the respective first plates 310 and the second plates 312 to engage and impart compression forces to the energy packs 304 in contact with the respective first and second plates 310, 312.

The spring units 302 provide a dynamic or variable compression rate (e.g., a dual compression rate) on the energy packs 304 to inhibit formation of moss or problematic dendrites (e.g., dendritic crystals on a surface of a lithium metal foil anode (negative electrode) during a charging cycle of a lithium battery). For example, the spring units 302 can impart a compression rate between 18 pounds per square inch (psi) and 100 pounds per square inch (psi) on the energy packs 304. In some examples, the energy packs 304 provide means for storing or providing energy. In some examples, the spring units 302 provide means for imparting forces. For example, the first spring unit 302a provides means for imparting a first force and the second spring unit 302b provides means for imparting a second force (e.g., to the first energy pack 304a). means for store energy. In some examples, the structure 202 provides means for provide a stack pressure and/or means for providing tension to a structure (e.g., the wing 200).

Figure 8:
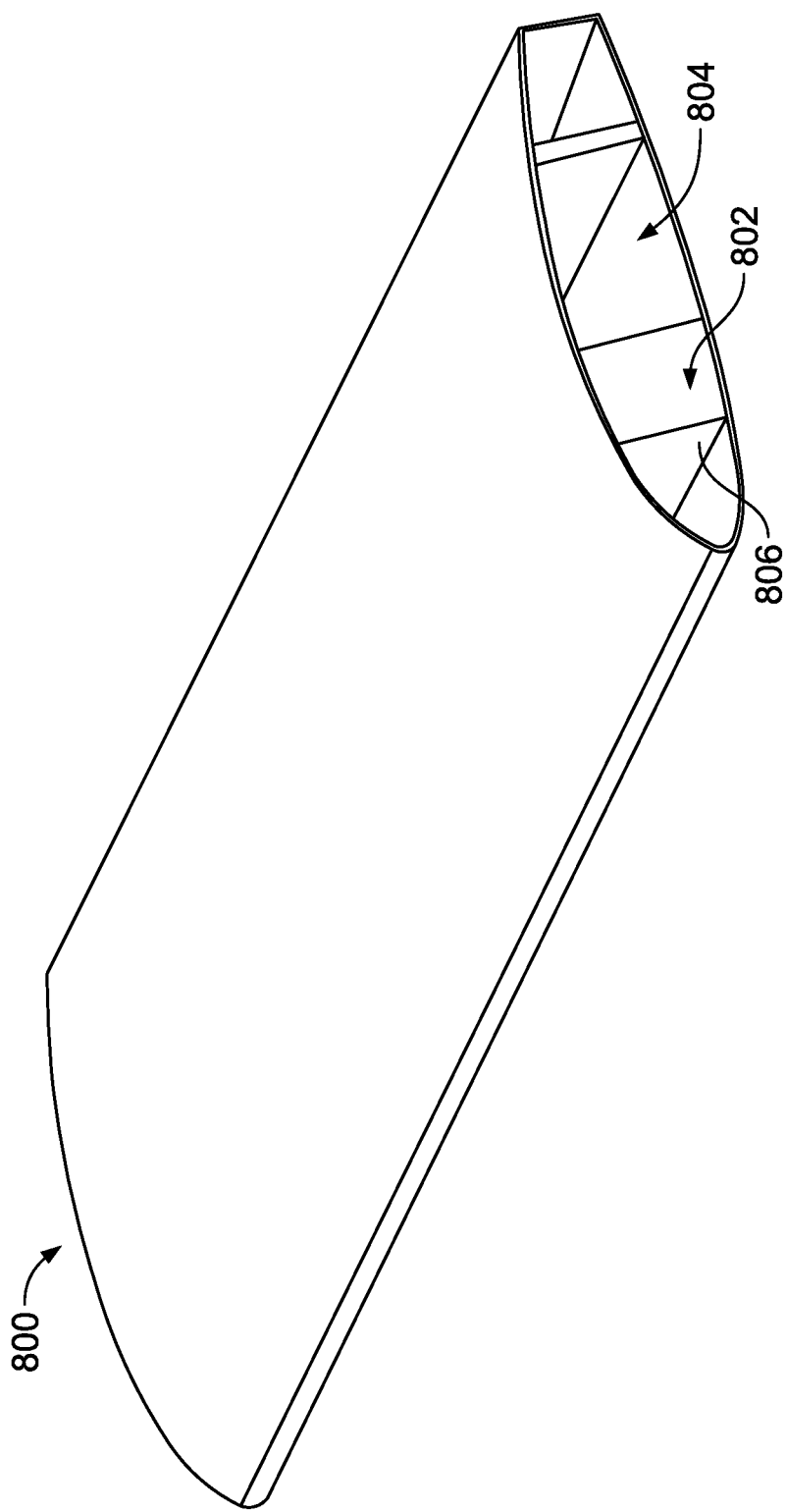
FIG. 8 is another example wing having another example structure disclosed herein.

FIG. 8 is another example wing 800 having another example structure 802 disclosed herein. The structure 802 of FIG. 8 is a spar for a wing box 804 of the wing 800. The structure assembly 802 has a housing 806 that includes a cavity to receive spring units (e.g., the spring units 302 of FIG. 3) and energy packs (e.g., energy packs 304 of FIG. 3) in a stacked, alternating configuration as shown in FIG. 3. In this example, the structure 802 can have spring units and energy packs that are similar or identical to the spring units 302 and the energy packs 304 of FIGS. 3, 4, 5A, 5B, 6, 7A, and 7B. In some examples, spring units and energy packs of the structure 802 can have square shapes or profiles to be received by the housing 806. For example, the first plates 310, the second plates 312, and the energy packs 304 can be configured to have square shapes, rectangular shapes, triangular shapes, and/or any other shapes and/or profiles to be received by the housing 806. In some examples, one or more of the first plates 310, the second plates 312, the energy packs 304, and/or the housing 806 can be shaped to have a profile of a structure such as, for example, an airfoil shape of the wing 200, 800. In some examples, the example structure 202 and the structure 802 can be configured for use with other structures or frames. Additionally, the structure 202 and/or the structure 802 can be configured for use with electronic devices, prosthetics, exoskeletons, machinery, manufacturing equipment, vehicles and/or any other device requiring batteries or energy storage.

Although certain example methods, apparatus and articles of manufacture have been described herein, the scope of coverage of this disclosure is not limited thereto. On the contrary, this disclosure covers all methods, apparatus and articles of manufacture fairly falling within the scope of the claims.

What is claimed is:

1. An apparatus comprising:
a first spring unit having a first plate spaced from a second plate and a first biasing element positioned between the first plate and the second plate, the first biasing element to enable the first plate to move relative to the second plate in a direction along a longitudinal axis of the apparatus;
a second spring unit having a third plate spaced from a fourth plate and a second biasing element positioned between the third plate and the fourth plate, the second biasing element to enable the third plate to move relative to the fourth plate along the longitudinal axis of the apparatus; and
a battery positioned between the first spring unit and the second spring unit.

2. The apparatus of claim 1, wherein the first spring unit and the second spring unit impart a tension force when the apparatus is coupled to a frame.

3. The apparatus of claim 1, wherein the first spring unit and the second spring unit impart compression forces to the battery.

4. The apparatus of claim 1, wherein the battery is a pouch-cell battery.

5. The apparatus of claim 1, wherein a thickness of the battery varies based on a charge state of the battery.

6. The apparatus of claim 5, wherein the first spring unit and the second spring unit impart a load on the battery as the thickness of the battery varies during a charging or discharging cycle.

7. The apparatus of claim 1, wherein the apparatus is a spar for supporting a wing of an aircraft.

8. The apparatus of claim 7, wherein the apparatus includes a length that extends between a distal end of the wing and a root of the wing.

9. The apparatus of claim 1, further including a guide rod extending through the first spring unit, the second spring unit and the battery.

10. The apparatus of claim 1, further including a power bus that couples to the battery.

11. An apparatus comprising:
a first plate;
a second plate;
a plurality of first springs positioned between the first plate and the second plate to enable the first plate to move relative to the second plate;
a third plate;
a fourth plate;
a plurality of second springs positioned between the third plate and the fourth plate to enable the third plate to move relative to the fourth plate; and
a battery positioned between the second plate and the third plate, the first springs to impart a first force to a first side of the battery and the second springs to impart a second force to a second side of the battery opposite the first side.

12. The apparatus of claim 11, wherein the first springs and the second springs comprise leaf springs.

13. The apparatus of claim 11, wherein each of the first springs and the second springs has an arcuate shape when positioned between the respective first and second plates and the third and fourth plates.

14. The apparatus of claim 11, wherein the second plate moves toward the first side of the battery and the third plate moves toward the second side of the battery in response to a discharging of the battery.

15. The apparatus of claim 11, wherein the first plate includes a first lip to capture a first end of a first one of the first springs and the second plate includes a second lip to capture a second end of the first one of the first springs.

16. The apparatus of claim 15, wherein at least one of the first lip is to enable the first end of the first one of the first springs to pivot relative to the first lip or the second lip to enable the second end of the first one of the first springs to pivot relative to the second lip when the first one of the first springs compresses or expands in a direction along a longitudinal axis of the apparatus.

17. The apparatus of claim 11, wherein the first plate has a hexagonal shape.

18. The apparatus of claim 11, wherein the first springs are radially spaced about the first plate and the second plate relative to a longitudinal axis of the apparatus.

19. An apparatus comprising:
means for storing energy;
means for imparting a first force; and
means for imparting a second force, the means for storing energy positioned between the means for imparting the first force and the means for imparting the second force, the means for imparting the first force to impart a force a first side of the means for storing energy and the means for imparting the second force to impart a force to a second side of the means for storing energy opposite the first side.

20. The apparatus of claim 19, wherein the means for storing energy has a variable volume, the first means for imparting the first force and the second means for imparting the second force to maintain a compressive force on the means for storing energy during a charge and discharge cycle of the means for storing energy.

* * * * *